United States Patent [19]

Eto et al.

[11] 4,366,421
[45] Dec. 28, 1982

[54] INDEX APPARATUS FOR A ROTARY TABLE

[75] Inventors: Kunihiko Eto, Toyota; Tetsurou Yamakage, Anjoh; Kuniyuki Niwa, Kariya, all of Japan

[73] Assignee: Toyoda Koki Kabushiki Kaisha, Kariya, Japan

[21] Appl. No.: 270,234

[22] Filed: Jun. 4, 1981

[30] Foreign Application Priority Data

Jun. 23, 1980 [JP] Japan .................................. 55-85011

[51] Int. Cl.³ .................................................. G05B 5/01
[52] U.S. Cl. .................................. 318/466; 318/603; 74/813 C
[58] Field of Search ............... 318/626, 266, 466, 467, 318/468, 603, 484; 74/826, 813 C, 813 L

[56] References Cited

U.S. PATENT DOCUMENTS 3,795,155 3/1974 Price et al. ............................. 74/826
4,177,696 12/1979 Moss ................................. 74/813 C
4,184,107 1/1980 Turini et al. ........................ 318/467

*Primary Examiner*—J. V. Truhe
*Assistant Examiner*—A. Evans
*Attorney, Agent, or Firm*—Oblon, Fisher, Spivak, McClelland & Maier

[57] ABSTRACT

An index apparatus for a rotary table comprises first and second index plates connected to a driving motor. First and second switches are provided for generating first and second signals in cooperation with the first and second index plates each time the rotary table is rotated a unit angle. Third signal generating circuit is connected to the first and second switches for generating third signals, each of which is generated when the second signal is generated and disappears when the first signal disappears. Control circuit is provided for counting the number of the third signals to thereby stop the rotary table at a desired angular position when the number reaches to a preset number.

6 Claims, 7 Drawing Figures

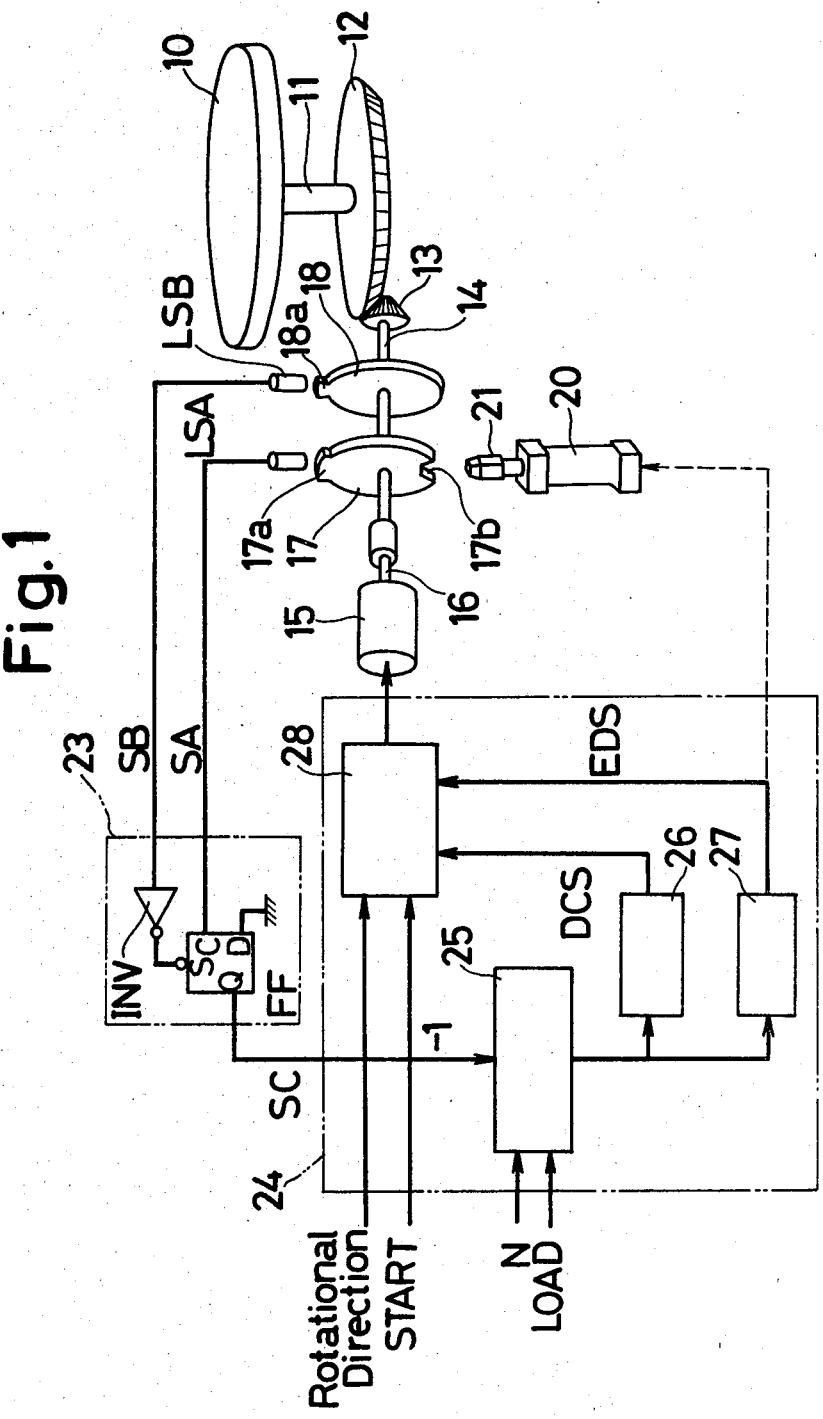

Fig. 2(a)
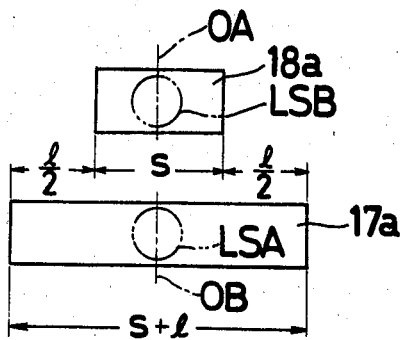
Fig. 2(b)
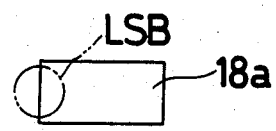
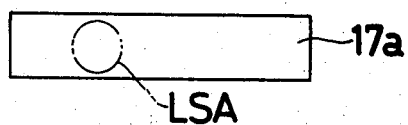
Fig. 2(c)
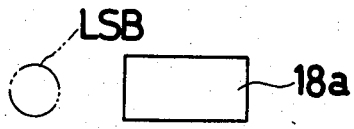
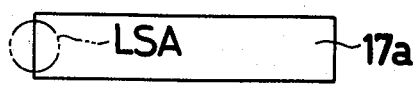

INDEX APPARATUS FOR A ROTARY TABLE

BACKGROUND OF THE INVENTION

1. Field of the Invention

The present invention relates to an index apparatus for indexing a rotary table to a desired angular position.

2. Description of the Prior Art

A conventional index apparatus is provided with a signal generating circuit including an index plate and a proximity switch for generating a signal each time a rotary table is rotated a unit angle. The rotary table is indexed to a desired angular position in response to the number of the signals generated from the signal generating circuit. However, when the rotary table is desired to stop quickly, it may be caused that the rotary table is stopped at a wrong angular position for the following reason. That is, when the rotational speed of the rotary table is abruptly reduced by applying the brake to a driving motor, a driving shaft connected to the driving motor to rotate the rotary table is twisted due to the inertia of the rotary table and is stored up an energy. The energy causes a vibration phenomenon of a periodic rotational movement of the rotary table in alternate opposite directions.

Therefore, if the vibration occurs at the vicinity of a position where the proximity switch is turned on or off by the index plate, a plurality of signals are generated due to the vibration out of relation to the actual rotation of the rotary table, and the rotary table is indexed to a wrong angular position.

SUMMARY OF THE INVENTION

Accordingly, it is an object of the present invention to provide a new and improved index apparatus capable of reliably indexing a rotary table to a desired angular position.

Another object of the present invention is to provide a new and improved index apparatus capable of reliably generating one signal each time the rotary table is rotated a unit angle without being affected by a vibration of the index apparatus.

Briefly, according to the present invention, these and other objects are achieved by providing an index apparatus for a rotary table, as mentioned below. A driving motor is provided for rotating the rotary table, and a first actuating member is connected to and rotated by the driving motor. A first switch is provided for generating a first signal when actuated by the first actuating member each time the rotary table is rotated a unit angle. A second actuating member is connected to and rotated by the driving motor. A second switch is provided for generating a second signal when actuated by the second actuating member each time the rotary table is rotated a unit angle. The first and second actuating members are so formed that the first signal is generated earlier and disappears later than the second signal. Third signal generating means is connected to the first and second switches for generating third signals each of which is generated when the second signal is generated and disappears when the first signal disappears. Control means is connected between the third signal generating means and the driving motor for counting the number of the third signals to thereby stop the rotation of the driving motor when the number of the third signals reaches to a predetermined number.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which:

FIG. 1 is a schematic view of an index apparatus according to the present invention;

FIGS. 2(a), 2(b) and 2(c) show the relationship between the projections of the index plates and the proximity switches shown in FIG. 1;

DETAILED DESCRIPTION OF THE PREFERRED EMBODIMENT

Figure 3:
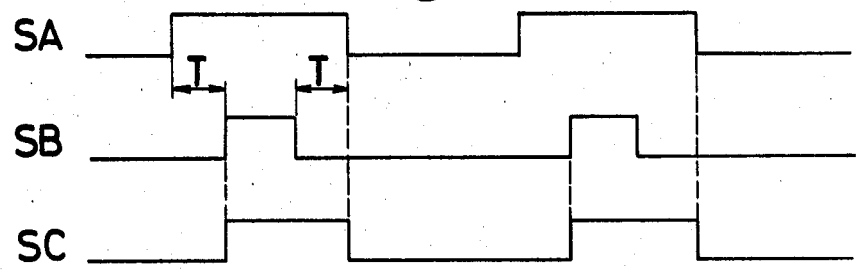
FIG. 3 is an explanatory view illustrating the signals generated from the proximity switches and the third signal generating circuit shown in FIG. 1.

Referring now to the drawings, wherein like reference numerals or characters refer to identical or correspondng parts throughout the several views, and more particularly to FIG. 1, there is shown a rotary table 10 to which a rotary shaft 11 and a bevel gear 12 are secured. An output shaft 16 of a driving motor 15 is connected to a driving shaft 14 which has a bevel gear 13 at one end thereof. The rotation of the driving motor 15 causes the rotary table 10 to rotate through the meshing engagement of the bevel gears 12 and 13, so that one revolution of the driving shaft 14 causes the rotary table 10 to rotate a unit angle. The driving shaft 14 has secured thereto first and second index plates 17, 18 which have radially extending projections 17a, 18a formed on the outer periphery thereof, respectively. The lengthes of the projections 17a, 18a are different from each other, taken in the circumferential direction thereof, referred to later in FIGS. 2(a), 2(b) and 2(c). The first index plate 17 is formed with a notch 17b, referred to later. First and second proximity switches LSA, LSB are provided facing to the first and second index plates 17, 18 respectively so as to generate first and second signals SA, SB, when actuated by the projections 17a, 18a during the rotation of the first and second index plates 17, 18. Accordingly, a set of the first and second signals SA, SB is generated from the proximity switches LSA, LSB each time the rotary table 10 is rotated a unit angle.

A flip-flop FF has three input terminals S, C, D and one output terminal Q, wherein the preset input terminal S thereof is connected to the second proximity switch LSB through an inverter INV, the clock input terminal C thereof is connected to the first proximity switch LSA, and the data input terminal D thereof is grounded. The flip-flop FF used in this embodiment may be a D type flip-flop, model SN7474 made by Texas Instrument Incorporated in Dallas, Texas. The third signal generating circuit 23 is arranged so that when the second signal SB is generated, the flip-flop FF is set and generates a third signal SC from the output terminal Q thereof, and when the first signal SA disappears, the flip-flop FF is reset and the third signal SC disappears, as shown in FIG. 3. In other words, the third signal SC is in its high level from the time when the second signal SB is generated until the time when the first signal SA disappears each time the rotary table 10 is rotated a unit angle.

A control circuit 24 is connected to the third signal generating circuit 23 so as to count the number of the third signals SC thereby indexing the rotary table 10 to a desired angular position. The control circuit 24 comprises a counter 25, first and second comparators 26, 27 and a driving circuit 28. The counter 25 is connected to the output terminal Q of the flip-flop FF and is arranged so that the content thereof is subtracted one by one each time the third signal SC is generated. The driving circuit 28 is connected to the driving motor 15 so as to control the rotation thereof in response to a start signal START from a manipulating panel, not shown, and signals DCS, EDS from the comparators 26, 27. The comparator 26 which is connected between the counter 25 and the driving circuit 28 is arranged to apply the signal DCS to the driving circuit 28 to reduce the rotational speed of the driving motor 15 when the content of the counter 25 is reduced to a predetermined number, in other words, when the rotary table 10 is rotated to a position spaced a predetermined angular distance from the desired angular position. The comparator 27 which is also connected between the counter 25 and the driving circuit 28 is arranged to apply the signal EDS to the driving circuit 28 to stop the rotation of the driving motor 15 when the content of the counter 25 becomes null. Further, a cylinder 20 is provided, and a pin 21 is received therein movably toward and away from the first index plate 17 so as to be engaged with and disengaged from the notch 17b of the first index plate 17.

Figure 4:
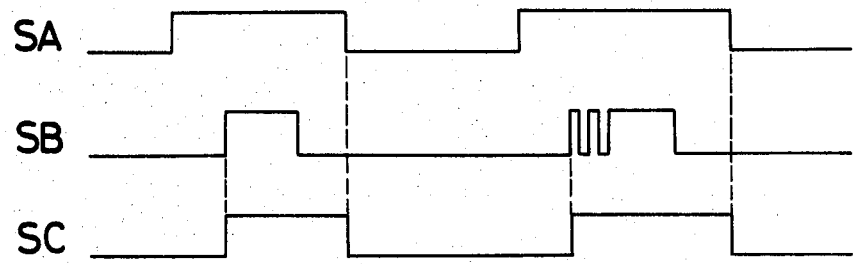
FIGS. 4 and 5 are explanatory views similar to FIG. 3, showing the signals when a vibration occurs.
Figure 5:
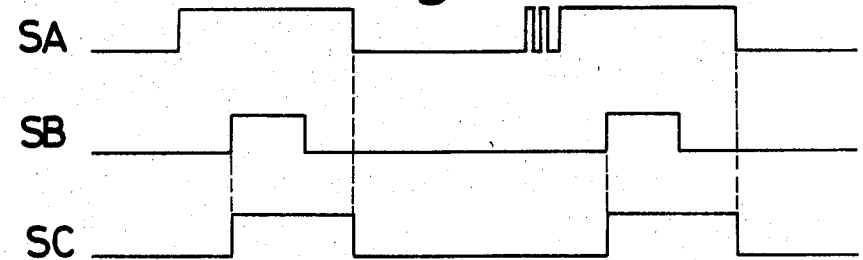

The relation between the projections 17a, 18a and the first and second proximity switches LSA, LSB is shown in FIGS. 2(a), 2(b) and 2(c), and the signals generated therefrom are shown in FIGS. 3, 4 and 5. The length of the projection 18a of the second index plate 18 is S, taken in the circumferential direction thereof, and the length of the projection 17a of the first index plate 17 is formed to be longer a predetermined length l than the projection 18a. The center lines OA, OB of the projections 17a, 18a are normally located in a plane which includes the axis of the drive shaft 14. The proximity switches LSA, LSB are also located in a plane which includes the axis of the drive shaft 14. The length l is set more than twice as long as a length corresponding to a maximum rotational extent of a potential vibration of the driving shaft 14, which vibration may occur when the rotational speed of the rotary table 10 is abruptly reduced in response to the signal DCS from the comparator 26. Due to the difference l in length between the projections 17a and 18a, the first signal SA is normally generated earlier and disappears later than the second signal SB by a predetermined time T corresponding to the half of the length l.

In the case that a vibration occurs at the vicinity where the proximity switch LSB is turned on or off as shown in FIG. 2(b), a plurality of the second signals SB are generated as shown in FIG. 4. However, it will be appreciated that the third signal SC is not affected by such a vibration because the third signal SC is generated when the first one of the plurality of the second signals SB is generated, and continues to be in its high level until the first signal SA disappears. Similarly, when a vibration occurs at the vicinity where the proximity switch LSA is turned on or off as shown in FIG. 2(c), and a plurality of the first signals SA are generated as shown in FIG. 5, the generation of the third signal SC is not affected by the vibration. Accordingly, one third signal SC is reliably generated each time the rotary table 10 is rotated one unit angle. Further, it will be appreciated that the third signal SC is reliably generated regardless of the rotational direction of the rotary table 10, since the projections 17a, 18a are formed symmetrically with respect to the plane in which the center lines OA, OB are located.

The operation of the above index apparatus for the rotary table 10 according to the present invention will now be described. The operation is initiated by setting into the counter 25 a number N corresponding to the extent of a desired angle of rotation and by setting into the driving circuit 28 the direction of rotation of the rotary table 10. The start signal START is then applied to the driving circuit 28, thereby causing the same to rotate the driving motor 15 at high rotational speed in the desired rotational direction. As the driving shaft 14 rotates together with the output shaft 16, the rotary table 10 is rotated at high rotational speed through the bevel gears 12, 13 and the rotary shaft 11. At the same time, a set of the first and second signals SA, SB are generated from the proximity switches LSA, LSB each time the rotary table 10 is rotated a unit angle. Then, in response to the signals SA, SB, the third signal SC is generated from the flip-flop FF of the third signal generating circuit 23. The number N preset in the counter 25 is subtracted one by one each time the third signal SC is generated. When the number contained in the counter 25 is decreased to a predetermined number, the comparator 26 detects the approach of the rotary table 10 to the desired angular position and applies the signal DCS to the driving circuit 28 to thereby reduce the rotational speed of the rotary table 10 by applying the brake such as regenerative braking to the driving motor 15. It is noted that with the provision of the index plates 17, 18, the proximity switches LSA, LSB and the third signal generating circuit 23, the third signals SC do not fail to be generated regardless of a potential vibration caused by the brake applied to the driving motor 15. After the signal DCS is applied to the driving circuit 28, the rotary table 10 is rotated at a low rotational speed, and subsequently when the number contained in the counter 25 becomes null, the comparator 27 which is connected to the counter 25 applies the signal EDS to the driving circuit 28 to thereby stop the rotation of the driving motor 15. After the rotary table 10 is stopped, the pin 21 of the actuating cylinder 20 is extended so as to be engaged with the notch 17b of the index plate 17 to thereby accurately index and lock the rotary table 10 at the desired angular position.

In the above-described embodiment, the flip-flop FF used in the third signal generating circuit 23 is of a D type flip-flop. Such a flip-flop is advantageous to detect the breakdown of the proximity switches LSA, LSB, because when either of them gets out of order, the flip-flop is kept set or reset regardless of the rotation of the rotary table 10. However, if it is not necessary to detect the breakdown of the proximity switches, an R-S type flip-flop circuit comprised of two NAND gates may be used, in which the first signal SA is sent to the reset input terminal thereof and the second signal SB is sent to the set input terminal thereof through an inverter.

As above-mentioned, with the provision of the two index plates 17, 18 which have the projections 17a, 18a of different lengths, two proximity switches LSA, LSB and the third signal generating circuit 23, a third signal SC is reliably generated each time the rotary table 10 is rotated a unit angle without being affected by a vibration of the rotary table 10. As a result, the rotary table 10 is accurately indexed to a desired angular position.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. An index apparatus for a rotary table comprising:
    a driving motor for rotating said rotary table;
    a first actuating member connected to and rotated by said driving motor;
    a first switch for generating a first signal when actuated by said first actuating member each time said rotary table is rotated a unit angle;
    a second actuating member connected to and rotated by said driving motor;
    a second switch for generating a second signal when actuated by said second actuating member each time said rotary table is rotated a unit angle;
    said first and second actuating members being so formed that said first signal is generated earlier and disappears later than said second signal;
    third signal generating means connected to said first and second switches for generating third signals each of which generated when said second signal is generated and disappears when said first signal disappears; and
    control means connected between said third signal generating means and said driving motor for counting the number of said third signals to thereby stop the rotation of said driving motor when the number of said third signals reaches to a predetermined number.

2. An index apparatus for a rotary table as set forth in claim 1, wherein said first and second actuating members have radially extending first and second projections, respectively, which have the different lengths from each other, and said first and second switches are proximity switches.

3. An index apparatus for a rotary table as set forth in claim 2, wherein said third signal generating means comprises a flip-flop for receiving said first signal and an inverter connected thereto for receiving said second signal, whereby each of said third signals is generated when said second signal is generated and disappears when said first signal disappears.

4. An index apparatus for a rotary table as set forth in claim 3, wherein said control means comprises a counter in which said predetermined number which is preset is subtracted one by one each time said third signal is generated.

5. An index apparatus for a rotary table as set forth in claim 4, wherein said control means further comprises:
    a first comparator connected to said counter for generating a fourth signal when said predetermined number preset in said counter is decreased to a certain number by subtraction;
    a second comparator connected to said counter for generating a fifth signal when said predetermined number preset in said counter becomes null by subtraction; and
    a driving circuit connected between said first and second comparators and said driving motor so as to reduce the rotational speed of said driving motor in response to said fourth signal from said first comparator and stop the rotation of said driving motor in response to said fifth signal from said second comparator.

6. An index apparatus for a rotary table as set forth in claim 4, further comprising:
    a cylinder;
    a pin slidably received in said cylinder; and
    a notch formed on said first actuating member so as to be engaged with said pin for preventing the rotation of said rotary table when said pin is extended from said cylinder.

* * * * *